Feb. 28, 1956        S. J. FRESCH        2,736,436
FILTER CARTRIDGE UNIT AND METHOD OF MAKING THE SAME
Filed Feb. 7, 1952        2 Sheets-Sheet 1
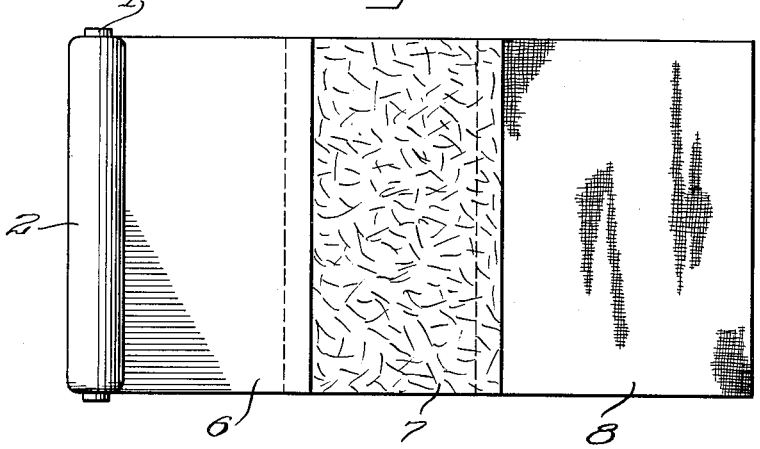
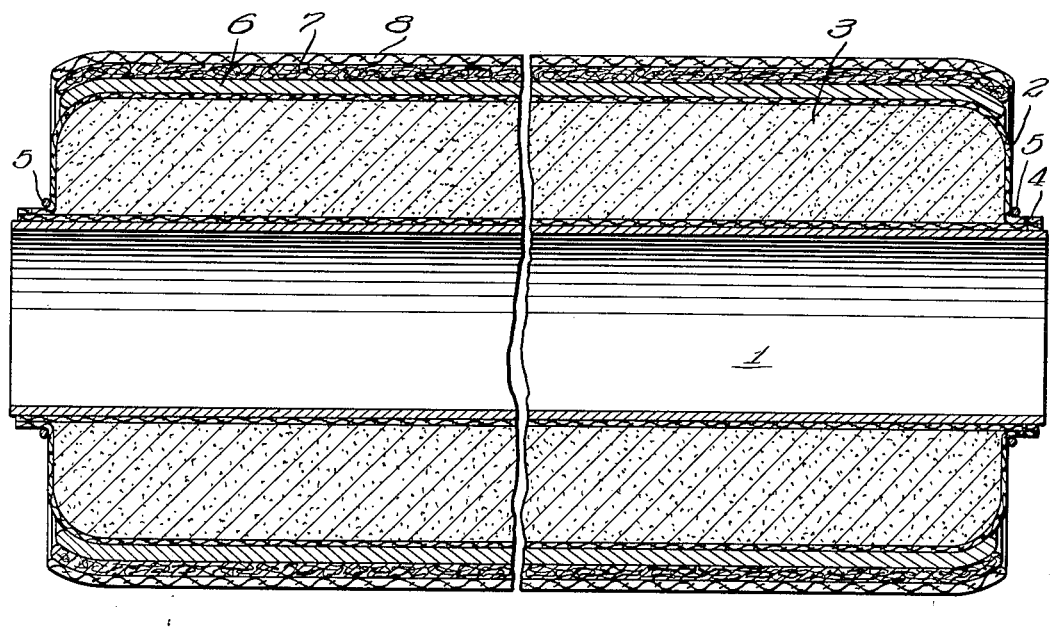
Inventor:
Sylvester J. Fresch Feb. 28, 1956 S. J. FRESCH 2,736,436
FILTER CARTRIDGE UNIT AND METHOD OF MAKING THE SAME
Filed Feb. 7, 1952 2 Sheets-Sheet 2
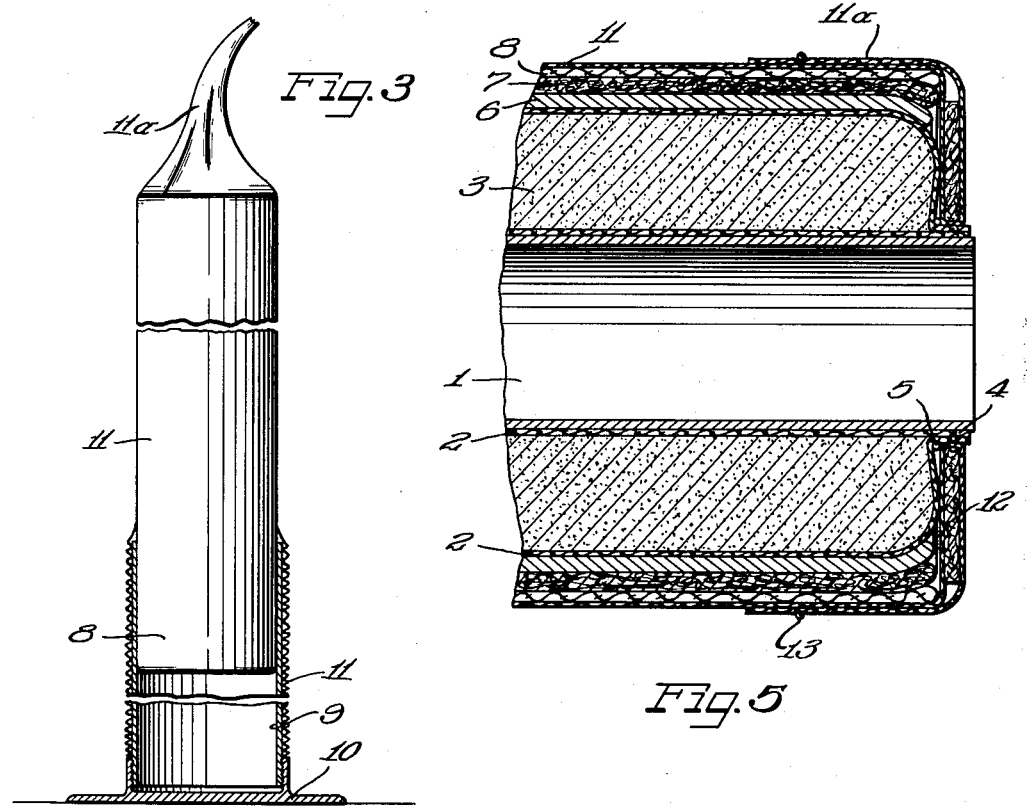
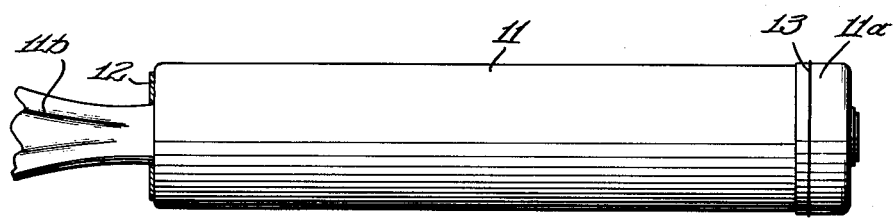
Inventor:
Sylvester J. Fresch

United States Patent Office 2,736,436
Patented Feb. 28, 1956

2,736,436

FILTER CARTRIDGE UNIT AND METHOD OF MAKING THE SAME

Sylvester J. Fresch, Lebanon, Ind., assignor to Houdaille-Hershey of Indiana, Inc., a corporation of Indiana Application February 7, 1952, Serial No. 270,422

2 Claims. (Cl. 210—203)

This invention relates to improvements in a filter cartridge unit and method of making the same, and more particularly to a cartridge highly desirable for the filtration of various liquids, which cartridge is removed and thrown away when contaminated to a predetermined extent, and a new cartridge is substituted for the used one, although the invention will have other uses and purposes as will be apparent to one skilled in the art.

This particular invention is highly desirable for use in connection with the filtration of oils such as lubricating oils, and may well be used for the filtration of lubricating oils for aircraft engines, although as stated above it will obviously have other uses and purposes.

In the past, many and various types of filter cartridge units have been developed, but very often they have proven prohibitively expensive, and equally as often they were too heavy in weight, consistent with adequate filtration, for use in many locations, such as on aircraft. In other instances, cartridge units developed heretofore did not give what might be termed for convenience progressive filtration for the purpose of successively removing impurities through a graduated range of sizes. In addition, it might be noted that cartridges of this type heretofore developed did not have as long a life as desired before reaching a stage of contamination rendering the cartridge inefficient.

With the foregoing in mind, it is an important object of the instant invention to provide a filter cartridge unit which is relatively light in weight, highly efficient, economical, and easily interchangeable.

Another object of the invention resides in the provision of a filter cartridge unit arranged to successively remove coarse impurities, fine impurities, and acidity from a liquid being filtered.

Still another object of the invention resides in the provision of a filter cartridge unit for progressive filtration, embodying means to prevent sliming, means to remove coarse impurities, means to remove fine impurities, and means to remove acidity or a varnish build-up, in that order, from a liquid being filtered.

It is also a feature of this invention to provide a filter cartridge unit of tubular shape, embodying a plurality of concentric layers of different filtering media over which cartridge a fabric tube is stretched and secured, such fabric tube holding the unit in proper shape for easy handling, and also preventing sliming of the unit during use.

Still another feature of the invention resides in the provision of a filter cartridge unit embodying a felt-like filter medium, a cellulosic sheet-like filter medium, and an earth-like filter medium, arranged in concentric layers and in that order in the direction of flow of liquid through the filter cartridge, to provide progressive stages of filtration for the particular liquid.

A still further object of the instant invention resides in the provision of a filter cartridge unit of the rolled type, embodying concentric layers of different filter media disposed around a temporary tube which is automatically pushed out of position, when the cartridge is inserted in a casing having a center tube therein.

It is a further feature of the invention to provide a new and novel method of making a filter cartridge unit.

While some of the more salient features, characteristics and advantages of the instant invention have been above pointed out, others will become apparent from the following disclosures, taken in conjunction with the accompanying drawings, in which—

Figure 1 is a plan schematic view illustrating the initial layout for forming or rolling a filter cartridge unit embodying principles of the instant invention;

Figure 2 is an enlarged fragmentary vertical sectional view showing the structure of Fig. 1 in rolled condition;

Figure 3 is a rather schematic, part elevational and part vertical sectional view, illustrating a further step in the making of the filter cartridge;

Figure 4 is an elevational view of a cartridge unit nearing completion; and

Figure 5 is an enlarged fragmentary vertical sectional view through the right hand portion of the structure of Fig. 4, illustrating the completed cartridge.

As shown on the drawings:

Briefly, the illustrated embodiment of the instant invention embodies a filter cartridge unit of hollow cylindrical or tubular shape disposed around a relatively rigid temporary center tube. The unit is preferably rolled to provide concentric layers of different filter media, as distinguished from a spirally wound unit. These layers include an earth-like filtering medium, such as infusorial earth, diatomaceous earth, fuller's earth, keiselguhr, or equivalent acid removing earth means. The pulverized earth filtering medium is, of course, encased in a suitable bag formation. The next succeeding layer would be cellulosic sheet material, and an outer layer of felt-like or felty material to remove coarser particles may be disposed around the cellulosic sheet material. The different filter media are arranged in that order provided the liquid to be filtered passes radially through the cartridge from the outside toward the center. Obviously, if the cartridge is of such character that the liquid enters centrally of the cartridge and passes toward the outside thereof, the layers would be in reversed order. Over the entire cartridge a tube of stretchable fabric is positioned which not only retains the cartridge in shape during handling, but also prevents sliming during use.

The preferred construction of the instant invention may best be determined by describing the process of making the filter cartridge.

With reference now to Figs. 1 and 2, it will be seen that a temporary center tube 1, which may be made of a suitable thermoplastic, thermosetting plastic, fiber board, or other economical material, is provided with a bag 2 therearound containing a quantity of pulverized earth-like filter medium 3 as referred to above. The bag 2 is preferably formed of two pieces of light canvas or equivalent material stitched together as indicated at 4 and bound to the temporary tube 1 as by wire loops 5—5 at the ends thereof.

Now with reference particularly to Fig. 1, it will be seen that the tube 1 with the bag 2 secured thereto and containing its pulverized earth filter medium is utilized as a core for the winding operation. Adjacent this core a sheet 6 of laminated cellulosic sheet material is positioned. This cellulosic sheet material may comprise a number of laminations of thin tissue-like paper. The sheet 6 is of sufficient size to encircle the bag 2 once with slight overlap. Next the sheet 6 is a sheet or layer 7 of the felt-like or felty material, hair felt or jute felt being satisfactory for this purpose, and this sheet is sized to form a concentric layer around the sheet 6 when wound with very slight overlap. Next, a sheet 8 of cheesecloth is provided of sufficient size to provide a definite overlap of its end portions, and this cheesecloth being self-adhering by virtue of its construction, acts as a binder to assist in the winding of the felt-like sheet 7 and hold the cartridge structure in wound position for further operation. The arrangement of Fig. 1 is next rolled into the structure shown in Fig. 2, by any suitable form of mechanism. It will be noted that in Fig. 2 the cheesecloth layer is grossly exaggerated as to thickness for purposes of clarity.

The next operation is to stretch a tubular fabric over the structure of Fig. 2. Such tubular fabric may well be a knit cotton socking capable of considerable stretching. One economical and satisfactory method of attaching such stretchable fabric over the cartridge unit is illustrated in Fig. 3. A metallic cylinder or tube 9 seated in any suitable floor stand 10, is provided over its outer surface with an excess amount of the stretchable fabric tube 11. The filter cartridge formed to the extent shown in Fig. 2 is then inserted partially within the metallic tube 9, and a quantity of the fabric 11 is pulled over the exposed portion of the cartridge sufficiently to leave an extended end portion 11a projecting beyond the cartridge. The cartridge is then lifted out of the cylinder 9, bringing a part of the fabric 11 along therewith to cover the cartridge, and the fabric is severed below the inner end of the cartridge at a point to provide a freely projecting end portion 11b, seen in Fig. 4. The extended end portions 11a and 11b may then be grasped, and tension applied to them to stretch the body portion of the fabric tube 11 tightly over the cartridge.

After that stretching operation, the projecting ends 11a and 11b of the fabric are each passed through the central opening of a preferably soft felt-like washer 12. The central opening of this washer 12 is just sufficient to clear the end portion of the earth holding bag 2. Then, each end portion of the fabric tube is reversely turned over the washer and stretched backwardly over the body of the cartridge as seen clearly in Figs. 4 and 5. Each end portion is thereupon bound to the body of the cartridge unit by a tie cord 13 or the equivalent. The completed cartridge will have the appearance seen in Fig. 4, except that both ends will look the same as the right hand end.

In operation, the instant invention is highly efficient. The cartridge is utilized in a casing having an upstanding perforated center outlet tube securely mounted in such casing. The cartridge is inserted in the casing by slipping either end thereof in the casing over the center outlet tube, and as the cartridge is pressed into position, that center outlet tube forces the temporary tube 1 out of the cartridge. This temporary tube may then be disposed of, or saved and returned to the manufacturer of the cartridge unit, as may be desired.

During operation, liquid passes through the illustrated cartridge radially thereof from the outside toward the center. In so doing, a progressive filtration takes effect. For purposes of example, assuming that the liquid to be filtered is lubricating oil, it must first pass through the stretchable fabric 8, and this fabric prevents sliming of the filter cartridge. The liquid next passes through the layer of felt-like material 7 which removes the coarser impurities. Fine impurities are removed from the liquid when it passes through the next cellulosic sheet layer 6, and the final earth-like filter medium 3 removes any acid content or varnish build-up that might be contained in the oil. Thus, in the single cartridge a complete and thorough progressive filtration takes place so that only pure oil, free of acidity, comprises the filtrate. With such progressive filtration, it will be noted that the cartridge is extremely long lived. Further, the cartridge is economical to manufacture and use, and easily interchanged.

It will be understood that modifications and variations may be effected without departing from the scope of the novel concepts of the present invention.

I claim as my invention:

1. The method of making a filter cartridge, including the steps of rolling a plurality of different filter media into concentric layers to form a filter unit about a center tube, inserting the filter unit partially within a tube having a quantity of stretchable fabric over its outside surface, pulling a part of said fabric beyond the outer end of the unit, removing the unit with fabric over its entire outer surface and cutting off the fabric beyond the inner end of the unit, stretching the fabric by placing tension on the extended ends thereof, and reversely turning said ends over the body of the covered unit.

2. A filter cartridge of the progressive-stage type for liquids, including a closed bag of fine earth filtering medium, said bag having an aperture longitudinally therethrough, a smooth surfaced temporary tube of at least the length of said bag in said aperture, a layer of laminated cellulosic sheet material wound around said bag as a core, a layer of felt wound around said layer of cellulosic sheet material, both said layers being porous but said felt layer being more porous than the cellulosic layer, and a fabric covering enclosing all of said cartridge except said temporary tube, whereby said center tube may be slipped out of said cartridge when the cartridge is mounted for use.

References Cited in the file of this patent

UNITED STATES PATENTS

| | | |
|---|---|---|
| 1,860,229 | Briggs | May 24, 1932 |
| 2,230,883 | Glass | Feb. 4, 1941 |
| 2,233,093 | Carmen et al. | Feb. 25, 1941 |
| 2,314,640 | Winslow et al. | Mar. 23, 1943 |
| 2,375,345 | Burhans | May 8, 1945 |
| 2,379,582 | Kracklauer | July 3, 1945 |
| 2,463,137 | Bahlke | Mar. 1, 1949 |
| 2,521,833 | Dahl | Sept. 12, 1950 |
| 2,550,070 | LaBreque et al. | Apr. 24, 1951 |
| 2,550,853 | Nugent | May 1, 1951 |
| 2,554,748 | Lewis et al. | May 29, 1951 |